United States Patent

[11] 3,576,335

[72] Inventors Leonard J. Kowal
 Prospect Heights;
 Fritz A. Delander, Beverly Hills, Ill.
[21] Appl. No. 817,308
[22] Filed Apr. 18, 1969
[45] Patented Apr. 27, 1971
[73] Assignee I-T-E Imperial Corporation

[54] FLEXIBLE TUBE CONNECTION
 15 Claims, 5 Drawing Figs.
[52] U.S. Cl..................................................... 285/233,
 285/286, 285/302, 285/354
[51] Int. Cl..................................................... F16l 21/00
[50] Field of Search............................................ 285/233,
 234, 354, 48, 49, 50, 52, 302, 286

[56] References Cited
 UNITED STATES PATENTS
2,212,745 8/1940 McIntosh .................... 285/233
2,422,158 6/1947 Wolfram...................... 285/233
2,458,817 1/1949 Wolfram...................... 285/354X
2,578,933 12/1951 Hunter et al.................. 285/52X
3,400,953 9/1968 Sullivan....................... 285/50
 FOREIGN PATENTS
 250,541 3/1964 Australia...................... 285/234
 472,773 9/1937 Great Britain................ 285/234

Primary Examiner—Dave W. Arola
Attorney—Hofgren, Wegner, Allen, Stellman and McCord ABSTRACT: A tube connection wherein the tube end is provided with an enlargement for positively retaining the tube end in a fitting having a resilient annular seal member received between the enlargement and a flange of the nut member. The tube end enlargement may be secured to the tube end or may be formed in the tube end such as by a conventional first step of a double flare operation. The fitting flanged outer portion effectively limits the outward movement of the tube end by engagement of the enlargement therewith in the event that the tube end is drawn outwardly through the seal member.

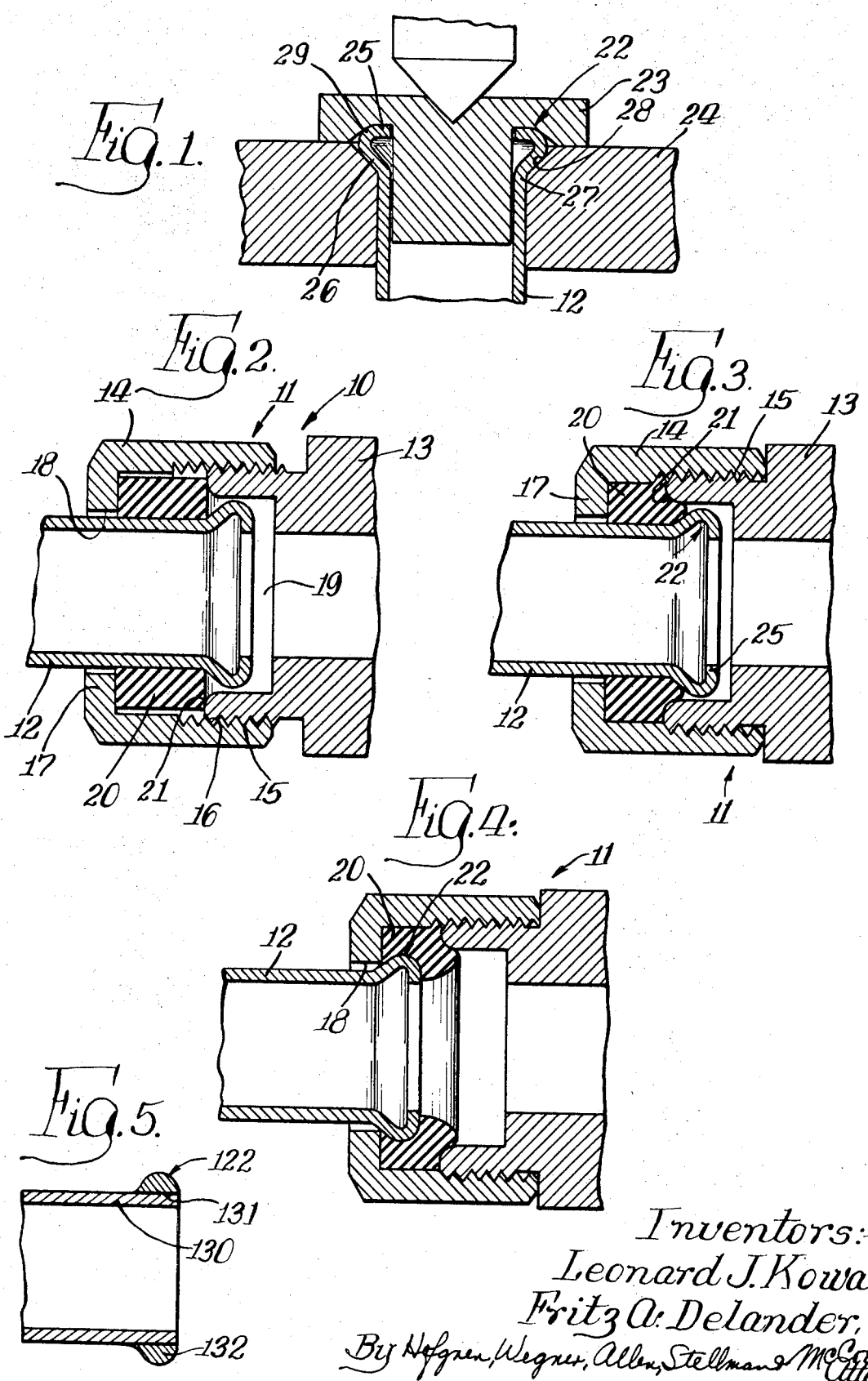

FLEXIBLE TUBE CONNECTION

BACKGROUND OF THE INVENTION

1. Field of the Invention

This invention relates to tube fittings and in particular to tube fittings having resilient means for supporting the tube end therein.

2. Description of the Prior Art

In conventional flexible tube fittings, the tube end is supported by a resilient seal member provided within the fitting. A serious problem arises in the conventional fittings, however, in that the tube end may be pulled outwardly through the seal member and from the fitting as a result of the relatively impositive retention of the tube end therein by the resilient support means. Another disadvantage of the known flexible tube fittings is the inability thereof to maintain the sealing connection over a wide temperature range. Still further, the known flexible tube fittings have the disadvantage of difficulty of maintaining the sealed connection up to the burst pressure of the tubing. In certain of the flexible tube fittings, metal-to-metal contact between the tube and metal portions of the fitting limits the flexible connection characteristics thereof. Another disadvantage of certain flexible tube fittings is the difficulty of removing the sealing member for replacement thereof. Still further in certain of the flexible tube fittings, the resilient sealing member may be improperly installed by virtue of an asymmetrical construction thereof.

Another disadvantage of known flexible tube fittings is the difficulty of maintaining the tube end in the fitting against relatively high pressures as well as maintaining the seal under such high pressures. A further disadvantage of certain known flexible tube fittings is a restriction in the flow passage therethrough. Yet another disadvantage of the known flexible tube fittings is the failure to provide means for positively preventing failure of the sealed connection under high pressures, severe temperature conditions, vibration, and high axial tension conditions.

Still another disadvantage of the known flexible tube fittings is the relative complexity and high cost thereof.

SUMMARY OF THE INVENTION

The present invention eliminates the above-discussed disadvantages of the known flexible tube fittings in a novel and simple manner. More specifically, the present invention comprehends an improved tube connection wherein the tube end is effectively positively retained in sealed association with the fitting notwithstanding relatively large forces tending to urge the tube outwardly from the fitting and under a wide range of temperature conditions. Further, the present invention comprehends such a tube connection wherein the tube end is normally resiliently supported free of metal-to-metal contact with the fitting while yet permitting angular adjustability of the position of the tube end relative to the fitting over a relatively wide range.

The invention further comprehends the provision of such a tube connection wherein the distal end of the tube defines a radial enlargement adapted to abut the resilient seal member of the fitting to provide an improved positive retention of the tube end in the fitting. The invention comprehends the provision of the enlargement at the outer end of the tube by suitable means such as by securing an annular element thereto as by compression, brazing, adhesive fastening, etc., as well as by forming the enlargement directly in the tube end itself. In the illustrated embodiment, the enlargement is formed in the tube and more specifically, is provided by performing the first step of a double flare operation on the tube end. The annular seal member may be installed prior or subsequent to the provision of the enlargement in the tube end, as desired.

The tube connection is adapted to maintain a sealed connection of the tube end with the fitting over a substantial temperature range and has been found to be effective to retain the tube end in association with the fitting up to and beyond the burst pressure of the tubing. The resilient support of the tube end effected by the seal member dampens vibrations and resiliently supports the tube end to prevent crystallization of the tubing material as often occurs in the conventional tube fittings. The seal member is readily removable for facilitated maintenance of the fitting. The seal member is symmetrical and, thus, cannot be installed in the fitting improperly.

The arrangement of the fitting is such that forces which tend to urge the tubing outwardly from the fitting cause an increase in the pressure thereagainst by the sealing support member. Resultingly, the sealing pressure between the tube end and the seal member is proportional to the pressure of the fluid in the fitting. Thus, the tube connection of the present invention provides a positive seal of the tube end into the fitting at pressures up to and beyond the burst pressure of the tubing.

The fitting is further arranged to have a positive mechanical interlock with the tube end in the event that the tube end is moved through the resilient seal member. Thus, blow out of the tube end from the fitting is effectively prevented. The fitting is arranged to provide an unrestricted flow passage through the tube connection. The fitting is extremely simple and economical of construction and provides long trouble-free life.

More specifically, the tube connection of the present invention comprehends a fitting having an internal space for receiving a tube end, an outer wall portion defining an opening through which the tube end extends into the space, a resilient annular seal member in the space adjacent the wall portion, with the tube end extending through the member to axially inwardly thereof, and an annular radially inwardly opening enlargement in he distal end of the tube axially inwardly of the seal member. BRIEF DESCRIPTION OF THE DRAWING Other features and advantages of the invention will be apparent from the following description taken in connection with the accompanying drawings, wherein:

FIG. 1 is a fragmentary diametric section of a tube end, showing the step of providing the annular enlargement in the distal end thereof;

FIG. 2 is a diametric section of a tube connection embodying the invention, prior to makeup of the fitting;

FIG. 3 is a diametric section similar to that of FIG. 2, illustrating the connection as upon completion of the makeup of the fitting;

FIG. 4 is a fragmentary diametric section illustrating the arrangement of the tube connection whereon the tube end has moved outwardly through the seal member to abut the nut flange; and FIG. 5 is a fragmentary diametric section of a modified form of tube enlargement means embodying the invention.
DESCRIPTION OF THE PREFERRED EMBODIMENTS In the exemplary embodiment of the invention as disclosed in FIGS. 1—4 of the drawing, a tube connection generally designated 10 is shown to include a fitting generally designated 11 for connection to the end of a tube 12. The fitting may include a body member 13 and a cooperating nut member 14 threadedly associated by means of threaded portion 15 on the body member 13 and threaded portion 16 on the nut member 14. The nut member includes an axially outer inturned flange 17 defining a wall provided with an axial opening 18 through which the tube 12 extends. The fitting 11 defines an internal space 19 in which the tube end 12 is received. The fitting further includes an annular seal 20 which, as shown in FIG. 2, is coaxially disposed about the tube end 12, axially inwardly of the nut flange 17. Seal 20 extends axially between the flange 17 and a shoulder 21 on the body member.

As shown in FIG. 1, tube end 12 is provided with a distal portion 22 defining a radially inwardly opening enlargement. The enlargement 22 may be formed by a conventional die 23 cooperating with a suitable support 24 to form in the distal end of the tube 12 a first flare of a conventional double flare. In such a first flare, the end portion 25 is effectively turned radially inwardly to comprise a flat substantially planar end portion, with the axially outer portion 26 of the flare extending generally frustoconically into a tubular connection 27 to the tube 12 as a result of the provision of a frustoconical backup surface 28 in the support member 24. As shown in FIG. 1, the internal diameter of the end portion 25 is generally similar to the internal diameter of the tube 12, whereas the outside diameter of the portion 22 is substantially larger than the external diameter of the tube 12.

Seal 20 may have any suitable configuration, e.g., a split ring, a coil, etc., and in the illustrative embodiment as shown in FIG. 2, the seal 20 comprises an annular, elastomeric member having an internal diameter substantially equal to the external diameter of the tube 12 so as to have a snug fit therewith in the assembled relationship. The diameter of flange opening 18 is made to be slightly greater than the external diameter of the tube 12, but substantially less than the outside diameter of the enlargement 22 as best seen in FIG. 4 so as to positively preclude the axial withdrawal of the tube end from the assembled arrangement of the fitting as shown in FIG. 2.

The seal 20 is compressed between nut flange 17 and body surface 21, as shown in FIG. 3, to provide a positive sealed sole support of the tube end outwardly of the enlargement 22 while permitting axial displacement of the tube end inwardly of said seal. As the enlargement extends radially behind the seal 20, withdrawal of the tube axially outwardly is effectively precluded. Fluid pressures acting to urge the tube end 12 axially outwardly merely increase the reaction pressure of the seal so as to maintain a stable, positive, sealed support of the tube end against high pressure.

As enlargement 22 is externally rounded at 29, the seal 20 may be readily removed by slightly stretching the seal as it is moved past the enlargement 22. The rounded portion 29 further permits the seal member to be installed by an axial movement over the enlargement onto the tube and, thus, replacement of the seal is effectively facilitated.

The assembly of the seal 20 on the tube end 12 may alternatively be effected by firstly moving the seal 20 over the tube end, and subsequently forming the flared enlargement 22 as the flare may be readily effected by conventional double flare tool means. Where the seal 20 is formed of a relatively rigid material, such method of assembling permits the installation of the seal on the tube end with minimum strain.

The seal 20 may be formed of any suitable seal material such as high temperature plastic, rubber, etc. Where the fluids carried by the tube 12 are corrosive, the seal may be of suitably formed anticorrosion material, such as Teflon (tetrafluorethylene polymer).

As shown in FIG. 4, the outer diameter of the enlargement 22 is preferably greater than the diameter of opening 18 in the flange 17 so that should the tube 12 be forcibly pulled through the seal 20, notwithstanding the effectively positive support thereof as discussed above, the flange provides a mechanical interlock effectively precluding withdrawal of the tube end from the fitting.

As the tube end 12 is effectively supported in fitting 11 by the resilient seal 20, an improved vibration-resistant, flexible connection of the tube end is obtained. Further, as the diameter of the opening 18 is greater than the diameter of the tube 12, angular displacement of the tube end from the coaxial relationship shown in FIG. 3 is permitted. The support of the tube 12 by the relatively long seal 20 provides a large area of support for effectively minimizing tendency of crystallization of the tube material which often results in fracture of the tubing in conventional flex fittings. Further, as the seal member is a simple symmetrical cylindrical structure, it may be installed in either direction and, thus, improper assembly on the tube end is precluded. As the seal member 20 backs on the flange 17, the need for backup rings and other similar conventional confining means as used in conventional flex fittings is eliminated. Further, as the enlargement 22 extends radially outwardly from the normal inside diameter of the tube 12, the flow passage through the connection end is unrestricted for improved efficiency in the connection.

As shown in FIG. 5, the invention further comprehends the provision of such a tube connection wherein the enlargement 122 may comprise a separate element 132 secured to the tube end 130. Thus, the element 132, which may have an outer configuration generally similar to that of the configuration of enlargement 22, may be secured to the tube end as by brazing, welding, adhesive means, or by constriction as at 131. The enlargement 122 functions similarly as enlargement 22 in cooperating with the seal 20 for effectively positively supporting and retaining the tube end in the fitting against axial withdrawal from the space 19.

The foregoing disclosure of specific embodiments is illustrative of the broad inventive concepts comprehended by the invention.

We claim:

1. In a tube connection including a fitting having an internal space for receiving a tube end, an outer wall portion defining an opening through which the tube end extends into said space, an inner wall portion defining the inner end of said space, and a resilient annular seal in said space inwardly adjacent said outer wall portion, said tube end extending in coaxially sealed association through said seal to axially inwardly thereof, the improvement comprising the provision on the tube end of a formed radial enlargement defining the axially inner distal portion of said tube end coaxially abutting the axial inner end of said seal whereby said seal effectively sealingly, resiliently supports said tube end against axially outward withdrawal thereof from said space, said enlargement comprising a radially out-turned axially outer portion engaging said resilient seal in the normal made-up arrangement of the fitting, a radially inturned distal axially inner end portion confronting said inner wall portion of the fitting whereby abutment of said inner end portion with said inner wall portion limits axially inward movement of the tube end through said space, and a rounded radially outer portion permitting movement of the seal over said enlargement both axially inwardly and outwardly to permit the seal to be installed on said tube end by movement thereof axially outwardly over said enlargement, and permit said enlargement to move axially outwardly through said seal into abutment with said outer wall as a result of an axially outward urging of said tube end and to move subsequently axially inwardly to said normal made-up arrangement wherein said enlargement is disposed axially inwardly of the seal said seal sealingly engaging said fitting and said tube end in all axial positions of said tube end therein.

2. The tube connection of claim 1 wherein the outside diameter of said enlargement is larger than said wall portion opening to provide a positive mechanical interlock precluding withdrawal of said tube and distal portion outwardly through said fitting wall portion opening.

3. The tube connection of claim 1 wherein said enlargement has an inside diameter substantially similar to that of the tube end.

4. The tube connection of claim 1 wherein the distal portion of said enlargement is substantially flat perpendicular to the axis of said tube end.

5. The tube connection of claim 1 wherein the axially outward portion of said enlargement tapers to a tubular connection with the tube end.

6. The tube connection of claim 1 wherein said enlargement comprises a deformation of the tube end corresponding to the first step of a conventional double type of tube flare.

7. The tube connection of claim 1 wherein said wall portion opening has a diameter greater than the outside diameter of the tube end outwardly of said enlargement to permit limited angular displacement of the tube end extended therethrough.

8. The tube connection of claim 1 wherein said tube is retained against axial displacement from the tube connection solely by the resilient seal and the outer wall portion of the fitting.

9. The tube connection of claim 1 wherein the outer portion of said enlargement is frustoconical extending axially outwardly.

10. The tube connection of claim 1 wherein said enlargement comprises a compressive deformation of the distal portion of the tube end.

11. In a tube connection including a fitting having an internal space for receiving a tube end, an outer wall portion defining an opening through which the tube end extends into said space, an inner wall portion defining the inner end of said space, and a resilient annular seal in said space inwardly adjacent said outer wall portion, said tube end extending in coaxially sealed association through said seal to axially inwardly thereof, the improvement comprising the provision on the tube end of a radially projecting element secured to the axially inner distal portion of said tube end coaxially abutting the axial inner end of said seal whereby said seal effectively sealingly, resiliently supports said tube end against axially outward withdrawal thereof from said space, said element comprising a radially and axially outer portion engaging said resilient seal in the normal made-up arrangement of the fitting, a radially and axially inner distal end portion confronting said inner wall portion of the fitting whereby abutment of said inner end portion with said inner wall portion limits axially inward movement of the tube end through said space, and a rounded radially outer portion permitting movement of the seal over said element both axially inwardly and outwardly to permit the seal to be installed on said tube end by movement thereof axially outwardly over said element, and permit said element to move axially outwardly through said seal into abutment with said outer wall as a result of an axially outward urging of said tube end and to move subsequently axially inwardly to said normal made-up arrangement of the fitting wherein said element is disposed axially inwardly of the seal, said seal sealingly engaging said fitting and said tube end in all axial positions of said tube end therein.

12. The tube connection of claim 11 wherein said enlargement is secured to the tube end by brazing.

13. The tube connection of claim 11 wherein said enlargement is secured to the tube end by welding.

14. The tube connection of claim 11 wherein said enlargement is secured to the tube end by adhesive means.

15. The tube connection of claim 11 wherein the enlargement is constrictively secured to the tube end.